United States Patent
Cottrell

(10) Patent No.: US 7,698,689 B2
(45) Date of Patent: Apr. 13, 2010

(54) METHOD FOR MEETING SMI DURATION LIMITS BY TIME SLICING SMI HANDLERS

(75) Inventor: Andrew P. Cottrell, San Jose, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 2374 days.

(21) Appl. No.: 10/217,751

(22) Filed: Aug. 13, 2002

(65) Prior Publication Data
US 2004/0034854 A1 Feb. 19, 2004

(51) Int. Cl.
G06F 9/45 (2006.01)
G06F 9/44 (2006.01)

(52) U.S. Cl. .................. 717/127; 717/143; 717/159; 712/40; 712/233; 712/244

(58) Field of Classification Search ......... 717/124–162; 714/37–39
See application file for complete search history.

(56) References Cited

U.S. PATENT DOCUMENTS

| | | | |
|---|---|---|---|
| 5,357,628 A | | 10/1994 | Yuen |
| 5,511,204 A | * | 4/1996 | Crump et al. ........... 713/330 |
| 5,615,331 A | * | 3/1997 | Toorians et al. ........... 714/9 |
| 5,621,886 A | | 4/1997 | Alpert et al. |
| 5,758,168 A | | 5/1998 | Mealey et al. |
| 5,974,573 A | | 10/1999 | Martin |
| 6,094,729 A | | 7/2000 | Mann |
| 6,108,744 A | * | 8/2000 | Lebee ........... 710/266 |

* cited by examiner

*Primary Examiner*—Chuck O Kendall
(74) *Attorney, Agent, or Firm*—Mahamedi Paradics Kreisman LLP; Christopher J. Brokaw

(57) ABSTRACT

A method that allows the context of an SMI task to be saved between SMIs. Upon entering an SMI handler for a task that needs to be split up into shorter SMIs, a new task context stack is created in memory. From that point forward, the SMI handler uses the task context, leaving the original stack unchanged. When the time limit for a single SMI is about to be reached, the CPU is directed back to the original stack, and the task context stack persists in memory and retains the context of the task in hand. The soft SMI exits with a return code or other indication to signify that a new SMI should be invoked to continue processing. The driver or other software that caused the first soft SMI then invokes another, passing in a code or other indication to signify that this is a continuation of a previously started task. On entering the SMI handler for the second time, the handler notes the request for continuation, switches back to the saved task context stack and continues processing where it left off.

13 Claims, 3 Drawing Sheets

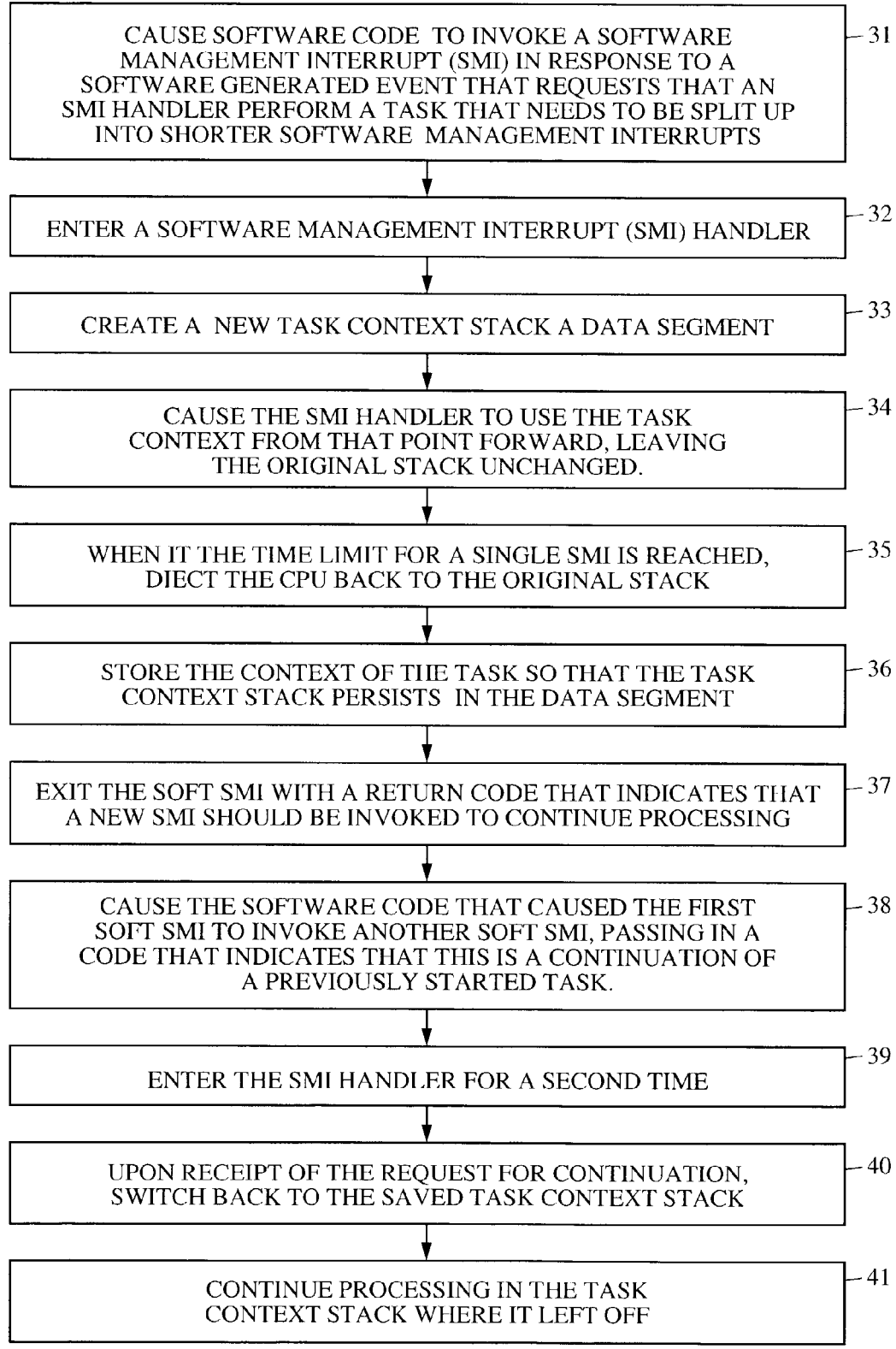

METHOD FOR MEETING SMI DURATION LIMITS BY TIME SLICING SMI HANDLERS

BACKGROUND

The present invention relates to computers, and more particularly to a method for overcoming system management interrupt (SMI) duration limits by time slicing SMI handlers.

As used herein, the term "soft SMI" means a system management interrupt (SMI) that occurs in response to a software-generated event, and is not generated by hardware alone. The term "service requester" is a driver or other executable code that invokes an SMI to request that an SMI handler perform a certain task. The term "SMI handler" is a software routine that was specifically identified by the service requester to perform the task. The term "SMI infrastructure" is a body of code that handles all SMIs, identifies the causes of the SMIs, and routes the execution path to the correct SMI handler for a given SMI cause. The term "SMM" refers to system management mode, which is a mode that a central processing unit (CPU) enters in response to an SMI event. The term "task" is a function or operation that is performed by the SMI handler for the service requester.

The term "context" is a body of data that maintains the state of a task while it is executing, including a succession of return addresses, parameters passed between subroutines, and temporary intermediate variables. The context of a task in an SMI handler is normally stored on a stack. The term "task context stack" is a temporary stack created for storage of the context of the specific SMI handler. This stack persists between SMIs until the task is complete. The term "SMI duration" is the delay from the invocation of an SMI by the service requestor until the return of control back to the service requester, and is a measure of the total time spent with the CPU in SMM for one SMI event. The term "SMI duration limit" is the maximum desired or permissible SMI duration.

Time spent in system management interrupt (SMI) mode is time spent away from the operating system (OS). While servicing an SMI, the OS is unable to task switch or service hardware interrupts. There is a practical limit as to how long an SMI can last before abnormal OS behavior is observed. A value of several hundred microseconds is often used as a maximum desirable SMI duration limit.

SMIs occur for two reasons. These are to service hardware events such as are used for power management or other system management events, and software events such as security operations or other runtime basic input/output system (BIOS) services. When the SMI occurs because a service was requested by software, this is called a software SMI or soft SMI. Many tasks that must be executed as a soft SMI take longer than the SMI duration limit. Particularly, complex cryptographic operations, for example, may take much longer.

One prior art solution is to break down these complex tasks into smaller sub-tasks and repeatedly invoke soft SMIs until the whole task is completed. This approach, however, calls for the re-engineering of the task in such a way that it can be broken down into smaller tasks. It would be desirable to have a method that overcomes the problems and limitations of such prior art solutions.

SUMMARY OF THE INVENTION

The present invention comprises a method for use in a system comprising a central processing unit (CPU) that allows the context of a system management interrupt (SMI) task to be saved between SMIs. A driver or other software invokes or generates a soft SMI (in response to a software generated event) that requests that an SMI handler perform a certain task that may need to be split up into shorter SMIs.

Upon entering the SMI handler, a new task context stack is created in memory. This memory could be a data segment within a system management memory region. From that point forward, the SMI handler uses the newly created task context stack, leaving the original context stack unchanged.

When the SMI duration limit for a single SMI is about to be reached, the CPU's stack pointer is directed back to the original context stack, the context of the task in hand is stored 36, and the new task context stack persists in memory and retains the context of the task that is to be suspended.

The soft SMI exits with a return code or other indication to signify that a new SMI should be invoked to continue processing. The driver or other software that caused the first soft SMI then invokes another, passing a code or other indicator that indicates that this is a continuation of a previously started task.

On re-entering the SMI handler, the SMI handler notes the request for continuation, switches back to the saved task context stack and continues processing where it left off. The task would be unaffected by the interruption, the behavior of the task would be the same with or without the flow of control returning to the service requester and then back into the task.

BRIEF DESCRIPTION OF THE DRAWINGS

The various features and advantages of the present invention may be more readily understood with reference to the following detailed description taken in conjunction with the accompanying drawing figure, described by way of example, wherein like reference numerals designate like structural elements, and in which:

FIG. 4 is a flow diagram that illustrates an exemplary method in accordance with the principles of the present invention.

DETAILED DESCRIPTION

Figure 1:
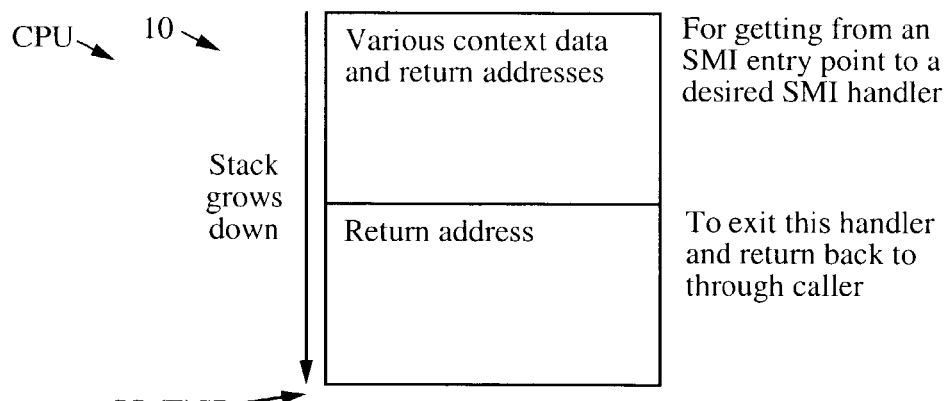
FIG. 1 illustrates an exemplary stack showing the stack state after execution flow has been routed by an SMI infrastructure to the correct SMI handler.
Figure 2A:
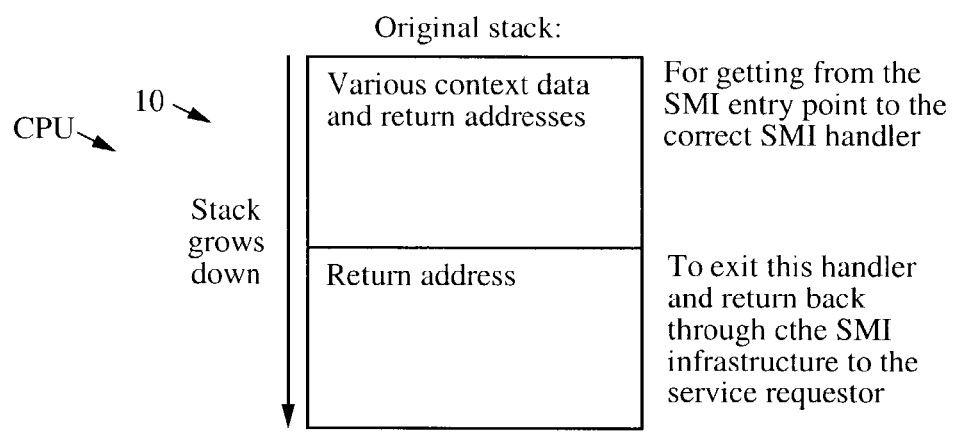
FIGS. 2a and 2b respectively illustrate original and task context stacks as they would be during the execution of a yield routine in accordance with the principles of the present invention.
Figure 2B:
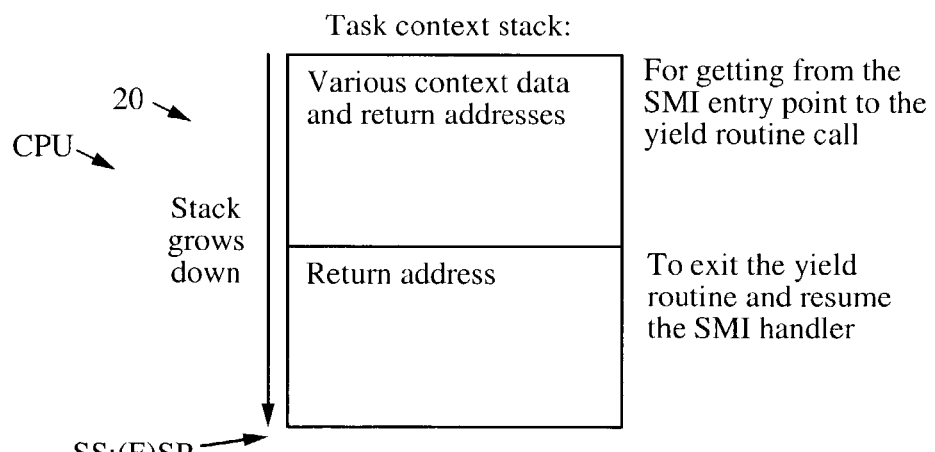
Figure 3A:
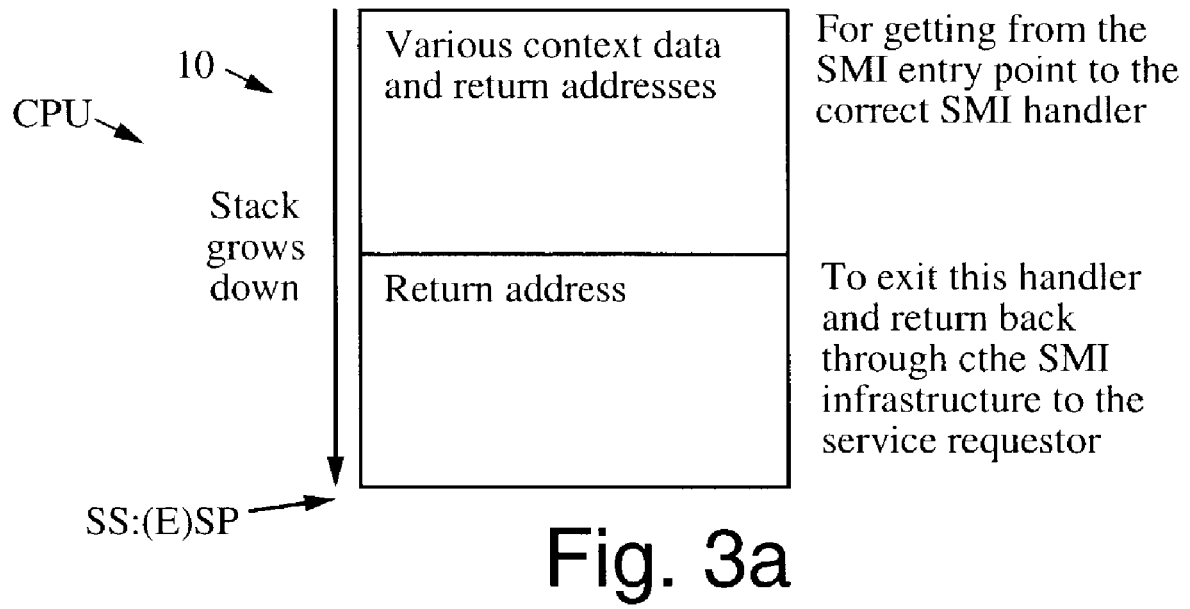
FIGS. 3a and 3b respectively illustrate original and task context stacks after the yield routine has switched the flow of execution back to the SMI handler.
Figure 3B:
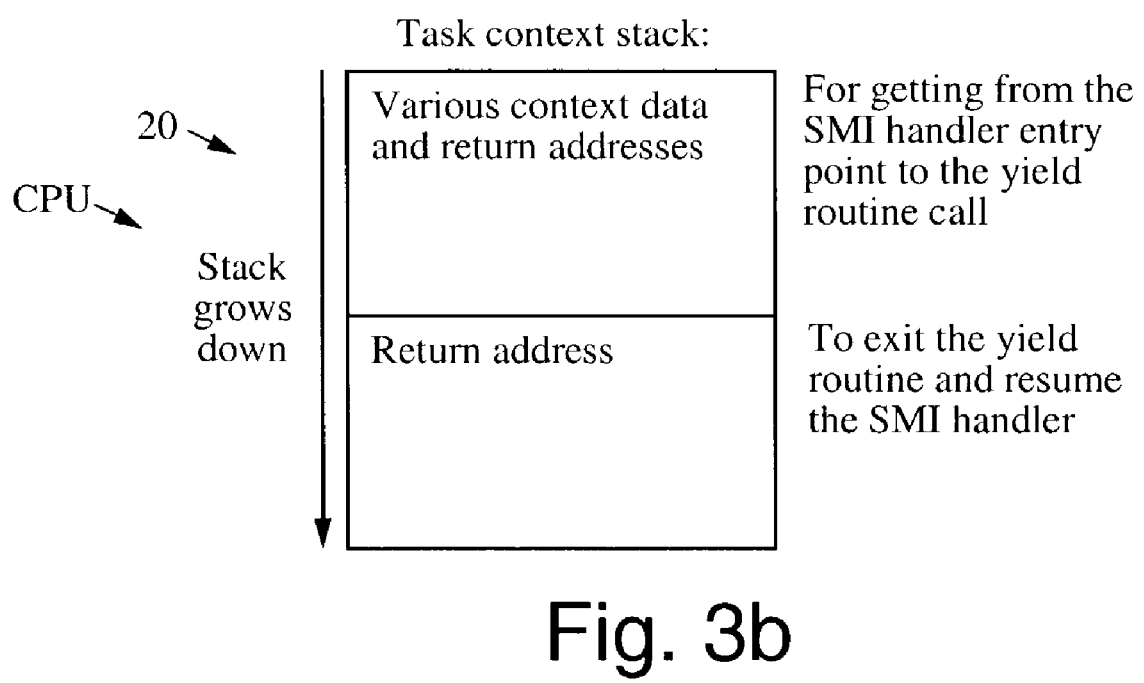

Referring to the drawing figures, FIG. 1 depicts a portion of a system comprising a central processing unit (CPU) having memory and illustrates an exemplary stack 10 showing the state of that stack after execution flow has been routed by an SMI infrastructure to a correct or desired SMI handler. Note that this initial state is common with many prior art implementations. FIGS. 2a and 2b respectively illustrate original and task context stacks 10, 20 inside a yield routine in accordance with the principles of the present invention. Note that SS:(E)SP (the CPU's stack pointer) points to the task context stack. FIGS. 3a and 3b respectively illustrate original and task context stacks 10, after the flow of control has been returned to the SMI handler. Note that SS:(E)SP now points to the original stack.

A service requester (a driver or other executable code) invokes an SMI handler, via a soft SMI in order to perform a complex processing task that will take longer than the SMI duration limit. The flow of execution is routed by the SMI infrastructure to the correct or desired SMI handler, as it normally would be. FIG. 1 illustrates the state of exemplary stack 10 after execution flow has been routed by the SMI infrastructure to the correct or desired SMI handler.

The SMI handler creates a new task context stack 20 (FIG. 2b) to store a new context associated with the task. The task regularly calls a yield routine to test if the SMI duration limit is about to be exceeded. Inside the yield routine, the original and task context stacks 10, 20 are as shown as depicted in FIGS. 2a and 2b, respectively.

If the yield routine determines that the SMI duration limit is about to be exceeded, it then adjusts SS:(E)SP (the stack pointer of the CPU) from the task context stack 20 back to the original context stack 10, sets a return code or other indicator to indicate to the service requester that this is a mid-task exit from system management mode (SMM). The original and task context stacks 10, 20 are as shown in FIGS. 3a and 3b, respectively. The SMI handler then executes a return instruction. Flow of control passes back through the SMI infrastructure to the service requester and the new task context stack 20 is preserved in SMM memory (memory reserved for system management mode operations).

On detecting that the return code or other indication denotes that the task has not completed, the service requester issues another soft SMI to allow the task to continue, this time passing a code or other indication to signify that this is a continuation request. The flow of execution is routed by the SMI infrastructure to the correct SMI handler as before. At re-commencement of the SMI handler, the original and task context stacks 10, 20 are again as is shown in FIGS. 3a and 3b, respectively.

The flow of execution is routed by the SMI infrastructure to the correct SMI handler as normal. The SMI handler detects the indication that this is a continuation request and immediately switches the stack pointer SS:(E)SP back to the new task context stack 20. A return instruction is then executed which causes a return back into the interrupted flow of execution as if exiting from the yield routine. The task that executed the yield instruction is not affected by the exit and re-entry of SMI and continues as if the yield routine did nothing.

With reference to FIG. 4, it is a flow diagram that illustrates an exemplary method 30 in accordance with the principles of the present invention. The method 30 is used in a system comprising a central processing unit (CPU) that allows the context of an SMI task to be saved between SMIs.

A driver or other software (code) invokes 31 or generates 31 a soft SMI (in response to a software generated event) that requests that an SMI handler perform a certain task that needs to be split up into shorter SMIs. Upon entering 32 the SMI handler, a new task context stack is created 33 in memory. From that point forward, the SMI handler uses 34 the newly created task context stack, leaving the original context stack unchanged.

When the SMI time duration limit for a single SMI is about to be reached, the CPU is directed 35 back to the original context stack and stores 36 the context of the task in hand. The new task context stack persists in memory and retains the context of the task that is to be suspended.

The soft SMI exits 37 with a return code or other indication to signify that a new SMI should be invoked to continue processing. The driver or other software that caused the first soft SMI then invokes 38 another soft SMI, passing a code or other indicator that indicates that this is a continuation of a previously started task.

On re-entering 39 the SMI handler for a second time, the SMI handler notes the request for continuation, switches 40 back to the saved task context stack, and continues 41 processing where it left off. As far as the task is concerned, its behavior is unaltered by the interruption of its execution.

Security Considerations

Where security is an issue, SMI handlers must ensure that sensitive data is not visible outside of system management mode (SMM) memory during a yield back to the service requester. One consequence of this is that buffers passed into the SMI handler must not be used to store intermediate data.

How to Yield

The above example yielded control from the SMI handler back to the service requestor when the SMI duration limit was reached by means of the SMI handler regularly calling a yield routine. An alternative, though far more complex approach, is to establish an interrupt or exception servicing environment in SMM which enables a timer or other event generator to be set to generate an interrupt or exception after a duration a little shorter than the SMI duration limit and force a yield without requiring the cooperation of the SMI handler code.

Implementation Issues

Multiple Contexts

The main purpose for yielding back to the service requestor's environment is so that hardware interrupts can be serviced. One of those interrupts may be a timer that causes a task switch in the operating system. Under this scenario, a new task may be started without completing the first task. It is necessary when implementing the present invention to deal with this, ensuring this there is one task context stack 20 for each SMI handler that knows how to yield, and also one for each service requester that may call it.

Heap Management

If there is a memory heap available to the SMI handler, then care must be taken to avoid memory leaks. Allocations of memory must be associated with task contexts, and if a task context is destroyed, perhaps by calling the initial SMI a second time without completing the first, then the memory owned by that context must be released.

Hardware State

Care must also be taken not to yield without due regard to the state of hardware. If any hardware device, such as a floating-point unit (FPU), for example, contains a state that must be preserved between consecutive SMIs that comprise the execution of a task, then the yield function must save that state on the task context stack 20 before yielding.

Measuring Time Slices

Unless a timer interrupt is used, it may be difficult to establish when the SMI duration limit will be reached. Execution speed varies with many parameters including but not limited to processor and bus performance. One method to establish a time interval is to use a RDTSC (read time-stamp counter) instruction that reads the CPU time-stamp counter (TSC) that counts clock cycles. The duration or clock cycle intervals, however, can vary not only with processor, but with power management state. One way to be sure of the clock speed at any moment in time is to measure it.

An example solution is as follows. On some chipsets, a periodic SMI occurs at regular intervals. The handler for this interrupt would read the TSC, subtract the reading from the previous periodic SMI and calculate the clock speed. This value would change as the CPU throttles itself for power management. The TSC interval that corresponds to the SMI duration limit would then be calculable.

Another example is as follows. On some CPUs, various counters and timers are available that monitor the performance of the CPU by a variety of measures. Some of these measurements can be used to deduce the passage of a certain period of time. In some cases, it is possible for the achievement of the maximum value of the counter, or terminal value, to cause an exception or interrupt.

Using one of these performance-monitoring counters, the change in value associated with the SMI duration limit could be calculated. This value could be subtracted from the terminal count to provide the value that the performance-monitoring counter should be set to at the start of the each SMI invocation. The interrupt or exception caused by the counter would take place after the SMI duration limit had elapsed, and the SMI would exit back to the requestor with the task context preserved as before.

Thus, it can be seen that the present invention allows SMI handlers that would otherwise exceed acceptable execution times to be implemented without the need for re-architecting. This has particular application in the field of cryptography where certain standard operations are far slower than is acceptable for a single SMI.

Thus, a method for overcoming system management interrupt (SMI) duration limits by time slicing SMI handlers has been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for use in a system having a central processing unit (CPU) and a memory, comprising the steps of:
   causing software code to invoke a soft system management interrupt (SMI) in response to a software generated event that requests that an SMI handler perform a certain task that needs to be split up into shorter SMIs;
   entering the requested SMI handler;
   creating a new task context stack in memory;
   causing the SMI handler to use the new task context stack from that point forward, leaving the original context stack unchanged;
   when a time limit for a single SMI is about to be reached, directing the CPU back to the original context stack;
   storing the context of the task so that the task context stack persists in memory and the context of the task that is to be suspended is retained;
   exit the soft SMI returning an indication that signifies that a new SMI should be invoked to continue processing;
   causing the software code that caused the first soft SMI to invoke another soft SMI, passing an indicator that indicates that this is a continuation of a previously started task;
   re-entering the SMI handler;
   switching back to the saved task context stack; and
   continuing processing in the task context stack where it left off.

2. The method recited in claim 1 wherein a determination of when to exit back to the requesting driver or other software is made by a yield routine that is called periodically by the SMI handler.

3. The method recited in claim 2 wherein measurement of elapsed time spent in system management mode (SMM) is made by a yield routine inspecting a CPU clock cycle counter.

4. The method recited in claim 1 wherein the determination of when to exit back to the requester is made by an interrupt or exception-servicing environment within system management mode (SMM) that responds to events indicating the termination of a particular interval of time.

5. The method recited in claim 4 wherein the interval of time is established by a timer implemented in a silicon device on a motherboard of the CPU.

6. The method recited in claim 4 wherein the interval of time is established by an event generated by the CPU that indicates that a performance-monitoring counter has reached its terminal value.

7. The method recited in claims 6 wherein the initial value of the performance monitoring counter is set to a value such that the terminal value event will occur when the SMI duration limit is about to be reached.

8. The method recited in claims 3 wherein the value corresponding to the required time interval is calibrated using the values of a CPU clock cycle counter observed over successive SMIs with a known or calculable interval.

9. The method recited in claims 8 wherein the successive SMIs comprises a periodic SMI generated by a timer.

10. The method re cited in claims 5 wherein the value corresponding to the required time interval is calibrated using the values of a CPU clock cycle counter observed over successive SMIs with a known or calculable interval.

11. The method re cited in claims 10 wherein the successive SMIs comprises a periodic SMI generated by a timer.

12. The method re cited in claims 6 wherein the value corresponding to the required time interval is calibrated using the values of a CPU clock cycle counter observed over successive SMIs with a known or calculable interval.

13. The method re cited in claims 12 wherein the successive SMIs comprises a periodic SMI generated by a timer.

* * * * *